United States Patent [19]

Guichard

[11] Patent Number: 4,643,039

[45] Date of Patent: Feb. 17, 1987

[54] SPEED REDUCTION GEAR HAVING AXIAL AND TRANSVERSE COMPONENTS WHICH ARE IN EQUILIBRIUM

[76] Inventor: Roland R. Guichard, 10210 Chaource, France

[21] Appl. No.: 711,482

[22] Filed: Mar. 13, 1985

[30] Foreign Application Priority Data

Mar. 13, 1984 [FR] France ................. 84 03834

[51] Int. Cl.⁴ .................... F16H 1/16; F16H 1/20
[52] U.S. Cl. ............................... 74/410; 74/427
[58] Field of Search .......... 74/425, 427, 410, 458, 74/785, 416

[56] References Cited

U.S. PATENT DOCUMENTS

| | | | |
|---|---|---|---|
| 791,529 | 6/1905 | Abrey | 74/427 |
| 2,982,146 | 5/1961 | Stoeckicht | 74/410 |
| 3,115,791 | 12/1961 | Dean | 74/785 |
| 3,421,382 | 1/1969 | Henshaw et al. | 74/410 |
| 4,369,387 | 1/1983 | Maar et al. | 74/427 |

FOREIGN PATENT DOCUMENTS 919680 11/1954 Fed. Rep. of Germany .
1204907 11/1965 Fed. Rep. of Germany .
2826022 12/1979 Fed. Rep. of Germany .
2372998 8/1978 France ........................ 74/425
2455221 11/1980 France .
566498 9/1975 Switzerland ................ 74/425

*Primary Examiner*—William F. Pate, III
*Assistant Examiner*—John M. White
*Attorney, Agent, or Firm*—Cushman, Darby & Cushman

[57] ABSTRACT

The two endless screws (202, 203) and the four gear wheels (207, 209-307, 309) which mesh with the endless screws and with each other in pairs, have inclined teeth in opposite directions at an angle a, while the secondary gear wheels (210, 310) fixed in rotation with two respective ones of the gear wheels (209, 309) have teeth inclined at an angle b such that tan a/tan b=D1/D2, where D1 is the pitch diameter of the gear wheels and D2 is the pitch diameter of the secondary gear wheels. The secondary gear wheels (210, 310) mesh with tertiary gear wheels (213, 313) which are fixed on an intermediate shaft (315) which bears a gear wheel having straight teeth and forming part of an outlet reduction stage.

3 Claims, 4 Drawing Figures

SPEED REDUCTION GEAR HAVING AXIAL AND TRANSVERSE COMPONENTS WHICH ARE IN EQUILIBRIUM

The invention relates to a speed reduction gear for transmitting a rotary torque from an inlet shaft coupled to a high speed motor to an outlet shaft coupled to a low speed receiving mechanism.

The reduction gear concerned by the invention is of known type in which the inlet shaft bears two endless screws having oppositely inclined threads. Each endless screw meshes with two diametrically opposed gear wheels such that the transverse components and the axial components of the forces exerted on the screws cancel. On each side of the endless screw the two gear wheels situated on that side mesh with each other. Two diagonally opposed gear wheels are mounted on respective shafts having respective secondary gear wheels fixed thereto, and the two secondary gear wheels mesh with an outlet toothed wheel which is fixed to the outlet shaft. In a variant embodiment, the outlet toothed wheel is a ring having teeth on the inside and the secondary gear wheels are diametrically opposed so that the transverse components at the outlet shaft cancel. However, in another variant, the outlet toothed wheel is a genuine toothed wheel and the secondary gear wheels cannot be diametrically opposed and mesh therewith. As a result the outlet shaft is subjected to a transverse component.

Further, in both of these variants the secondary gear wheels have straight teeth as does the outlet toothed wheel with which they mesh. There is thus no axial component on the outlet shaft, but the gear wheels which are fixed in rotation on their shafts have inclined teeth corresponding to the teeth of the endless screws; these gear wheels together with the secondary gear wheels associated therewith are mounted to float in the axial direction by the means which connect them diagonally. This solution is rather complicated and leaves the possibility of friction between stops for these gear wheels, for their shafts, or for their floating mounting.

In the above-described reduction gear, the driving torque is transmitted from the inlet shaft to the outlet shaft via two parallel drive chains running from the two endless screws to the two secondary gear wheels.

The main aim of the invention is to provide a transmission of the above-defined known type having two drive chains, in which all the axial and transverse components are cancelled without any of the parts being provided with a floating mount.

A secondary aim of the invention is to provide a transmission which achieves the above-mentioned main aim and which provides an outlet shaft which is disposed orthogonally to the inlet shaft, and is either offset to one side of the housing relative to the central plane of the housing passing through the inlet shaft between its two endless screws, or else is situated in a central position in the said central plane of the housing which passes through the inlet shaft between its two endless screws.

In a transmission of the above-described type having two transmission chains running from two endless screws having opposite threads, the threads of said screws and the threads of the gear wheels engaging therewith are inclined at an angle a relative to a transverse plane; according to the invention, the secondary gear wheels are threaded at an angle b relative to a transverse plane, with the angles a and b being related by the equation: $\tan a / \tan b = D1/D2$ where D1 is the pitch diameter of the gear wheels, and D2 is the pitch diameter of the secondary gear wheels.

Further, the teeth of the two secondary gear wheels are inclined in opposite directions and these secondary gear wheels each mesh with a tertiary gear wheel. The two tertiary gear wheels have their teeth disposed in opposite directions and are fixed in rotation on an intermediate shaft to which a gear wheel having straight teeth is also fixed for a reduction stage.

When the inlet shaft is perpendicular to a central plane of a housing which contains the gear assembly, the intermediate shaft is preferably situated in the same plane and is orthogonal to the inlet shaft.

In accordance with a first variant embodiment, the outlet shaft is provided with a toothed wheel which meshes with the gear wheel having straight teeth, such that the outlet shaft is parallel to the intermediate shaft and is consequently offset relative to the central plane.

In accordance with a second variant embodiment, the intermediate shaft is hollow and is mounted free to rotate around the outlet shaft which is situated in the central plane; the gear wheel with straight teeth meshes with a plurality of planet wheels carried by a planet-carrier which is fixed to rotate with the outlet shaft; the planet wheels also mesh with a ring having inside teeth which ring is fixed concentrically with the intermediate shaft and with the outlet shaft.

In order to make the invention more understandable, there now follows a description of an embodiment which relates more particularly to a reduction gear transmitting torque from a motor to the windscreen wipers of a vehicle.

Reference is made to the accompanying drawings, in which.

Figure 1:
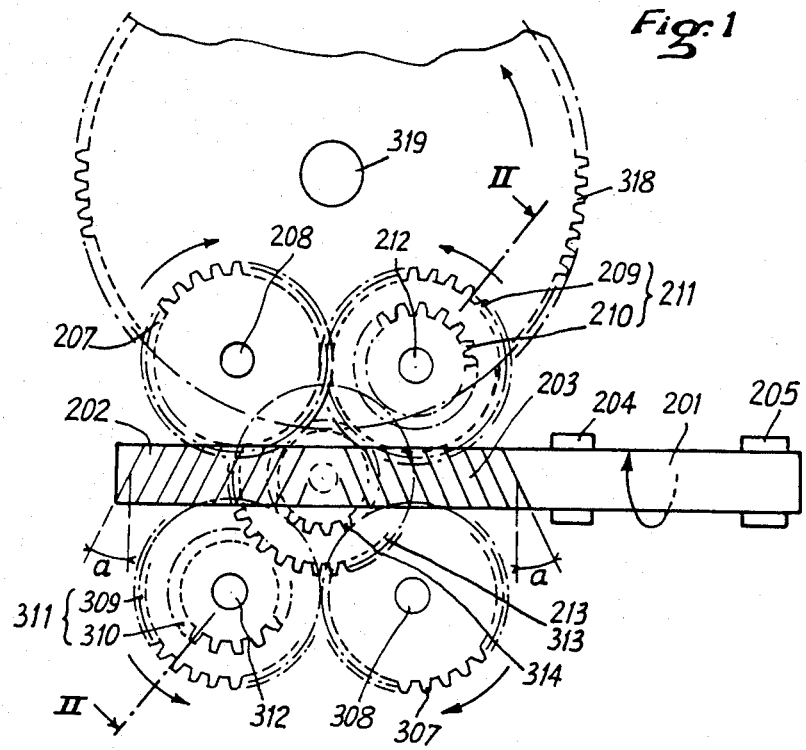
FIG. 1 is a diagrammatic elevation of a reduction gear in accordance with the invention, having two drive chains, and with its housing omitted.

A drive shaft 201 has two screw cuttings with one or more threads 202 and 203 of equal pitch but in opposite directions cut therein. The shaft 201 rotates in bearings 204 and 205 which are fixed to a housing 206 which is shown in section in FIG. 2 only. There is no end stop in the longitudinal direction. The drive shaft 201 is engaged in two drive chains:

an upper drive chain above the shaft and constituted by a gear wheel 207 rotating about its axis 208, and a gear wheel 209 which is fixed to a secondary gear wheel 210 and which constitutes together therewith an assembly 211 rotating about an axis 212. The teeth of the gear wheels 209 and 210 are cut to the same pitch and in the same direction; and a lower drive chain beneath the shaft 201 which is constituted by a gear wheel 307 rotating about its axis 308, and a gear wheel 309 which is fixed to a secondary gear wheel 310 and which constitutes together therewith an assembly 311 rotating about an axis 312. The teeth of the gear wheels 309 and 310 are cut to the same pitch and in the same direction.

The four gear wheels are chosen to have the same diameter. The four axes of rotation 208, 210, 308, 312 are parallel. The endless screw 202 meshes with the gear wheel 207 of the upper drive chain and with the gear wheel 309 of the assembly 311 of the lower drive chain. The endless screw 203 meshes with the gear wheel 307 of the lower drive chain and with the gear wheel 209 of the assembly 211 of the upper drive chain. Two of the gear wheels are at opposite ends of one diagonal of a rectangle and the other two gear wheels are at opposite ends of the other diagonal of the rectangle. Further, in each drive chain, the two gear wheels 201 and 209 mesh with each other as do the two gear wheels 307 and 309. The secondary gear wheel 210 of the assembly 211 and the secondary gear wheel 310 of the assembly 311 mesh with respective tertiary gear wheels 213 and 313.

Figure 2:
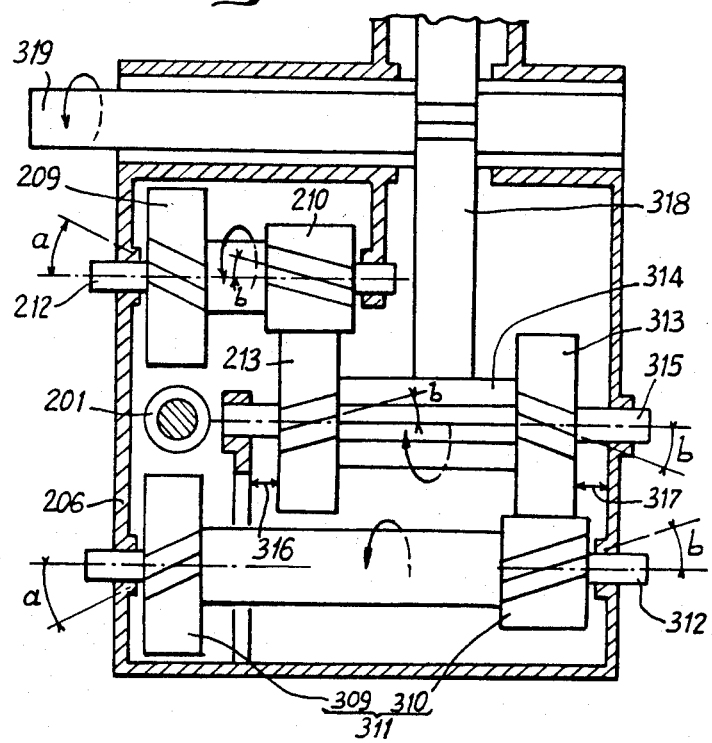
FIG. 2 is a plan view of the same reduction gear shown with its housing in section on line II—II of FIG. 1, and in accordance with a first variant of the description of the outlet shaft.

In the example illustrated in FIG. 2, the two tertiary gear wheels 213 and 313 are fixed to and rotate coaxially with a gear wheel 314 having straight teeth. This assembly 325 is free to move in an axial direction on a fixed shaft 315 which is fixed to the housing 206, with sufficient clearance 316 and 317 from the walls of the housing 206 to avoid any risk of friction.

Figure 4:
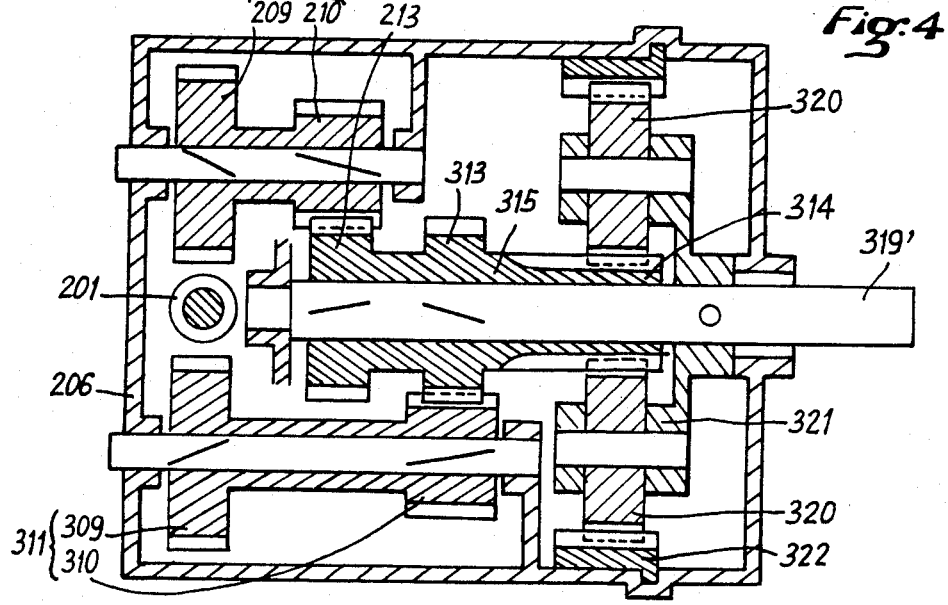
FIG. 4 is a similar view to FIG. 2, showing a second variation of the disposition of the outlet shaft.

The variant shown in FIG. 4 is described further on.

Naturally, each set of teeth is compatible with the teeth with which it meshes.

If the thread cutting on the endless screw 203 has a righthand pitch of inclination a, the gear wheels 209 and 307 have helically cut threads with a righthand inclination a. In this case, the thread cutting of the endless screw 202 has a lefthand inclination a and the gear wheels 309 and 207 have helically cut threading with a lefthanded inclination a.

The secondary gear wheel 210 has a helically cut thread with a righthand inclination b such that its axial cutting pitch is equal to that of the gear wheel 209 to which it is fixed. Likewise, the intermediate gear wheel 310 has a helically cut thread with a lefthand inclination b such that its axial cutting pitch is equal to that of the gear wheel 309 to which it is fixed.

The tertiary gear wheels 213 and 313 respectively have a helically cut thread with a lefthand inclination b compatible with the secondary gear wheel 210 and a helically cut thread with a righthand inclination b compatible with the secondary gear wheel 310.

The reduction ratios are the same in both drive chains.

When the reduction gear is in operation with a drive torque applied to the inlet shaft 201, and is balanced by a resistive torque exerted via the outlet shaft, the axial and transverse components of the forces to which the endless screws 202 and 203 are subjected are opposite and cancel by virtue of the construction described above.

It will now be shown that the same is true for the gear wheels 207, 307 and for the assemblies 211 and 311.

Each gear wheel 207, 307 is subjected by the corresponding endless screw 202, 203 to a first axial force, but it receives a reaction from the respective gear wheel 209, 309 with which it is meshed that results in a force perpendicular to its inclined teeth thereby giving rise to a second axial force which is equal and opposite to said first axial force.

Figure 3:
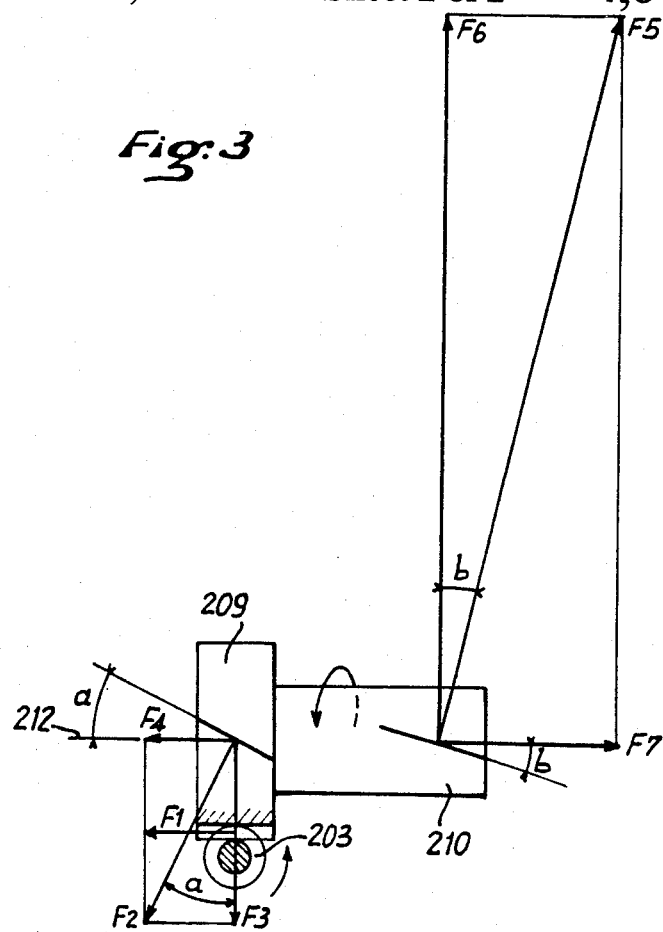
FIG. 3 is a diagram of a portion of the reduction gear showing one endless screw in section on a transverse plane together with a gear wheel and its secondary gear wheel.

Reference is made to FIG. 3 to show that each assembly 211 and 311 is also in an equilibrium state.

The endless screw 203 produces an axial component F1 on the teeth of the gear wheel 209. At its contact with the gear wheel 207 it receives a force F2 perpendicularly to its teeth inclined at an angle a which force can be decomposed into a transverse component F3 and an axial component F4. Since they derive from the same driving torque applied to teeth having the same inclination a, the axial forces F1 and F2 are equal and in the same direction.

The secondary gear wheel 210 which is associated with the gear wheel 209 in the assembly 211 is subjected on contact with the outlet gear wheel 314 to a force F5 which is perpendicular to its teeth which are inclined at an angle b. This force F5 can be decomposed into a transverse component F6 and an axial component F7 which is in the opposite direction to F1 and F4.

Each of the assemblies 211 and 311 is in an equilibrium state in the axial direction when $F7 = F1 + F4$.

The transmitted torque c is equally divided between the endless screws 202 and 203 with values c/2. The force F3 is thus equal to this value divided by the pitch diameter Dp of said screw and by the tangent of the angle of inclination of its threads. This gives $$F3 = (c/2Dp) \times (1/\tan a).$$

Consequently $$F1 = F4 = F3 \times \tan a = c/2Dp,$$

whence $$F1 + F4 = c/Dp.$$

The ratio of the radial force F6 on the gear wheel 210 over the force F3 on the gear wheel 209 is the same as the ratio of the pitch diameters of these gear wheels, i.e. D1 for the gear wheel 209 and D2 for the gear wheel 210. Thus:

$$F6 = (c/Dp) \times (1/\tan a) \times (D1/D2).$$

Now, the axial force F7 on the secondary gear wheel 210 is such that $$F7 = F6 \times \tan b.$$

From which it can be deduced that:

$$F7 = (c/Dp) \times (1/\tan a) \times (D1/D2) \times \tan b.$$

Each assembly 211, 311 is in a equilibrium state in the axial direction when:

$$c/Dp = (\tan b/\tan a) \times (D1/D2) \times (c/Dp),$$

whence the condition:

$$D1/D2 = \tan a/\tan b.$$

Each tertiary gear wheel 213, 313 is subjected to an axial component by virtue of its teeth being inclined. However, as can be seen in FIG. 2, these tertiary gear wheels 213 and 313 are mounted on the same intermediate shaft 315, and their teeth are inclined in opposite directions such that the axial components cancel and the intermediate shaft 315 is subjected to no resultant axial force.

The secondary gear wheels 210 and 310 which mesh with the tertiary gear wheels 213 and 313 are placed at opposite ends of the shaft 315 on which the tertiary gear wheels are mounted, so that the transverse components due to the inclination of the teeth are directed in opposite directions and substantially compensate each other.

In the variant shown in FIG. 2, the intermediate shaft 315 is supported inside the housing 206 in a central plane which passes through the middle of the inlet shaft 201 between the endless screws 202 and 203. This intermediate shaft 315 bears, between the two tertiary gear wheels 213 and 313, a gear wheel havang straight teeth 314 which meshes with a large diameter toothed wheel 318. This wheel is fixed in rotation on an outlet shaft 319. The outlet shaft 319 is orthogonal to the inlet shaft 201 and it is necessarily offset to one side of the housing 206 relative to the above-mentioned central plane.

In the variant illustrated in FIG. 4, the intermediate shaft 315 is fixed to rotate with the tertiary gear wheels 213 and 313 and it is hollow so as to contain an outlet shaft 319 dashed which is free to rotate therein, and which is directly supported by bearings in the housing 206 such that the intermediate shaft 315 is borne by the outlet shaft 319'. Consequently, the outlet shaft 319' is situated in the above-mentioned central plane and is disposed orthogonally to the inlet shaft 201. The gear wheel 314 having straight teeth is outside the tertiary gear wheels 213 and 313 at one end of the intermediate shaft 315. It meshes with a plurality of planet wheels 320 which are freely mounted to rotate on a planet-carrier 321. The planet-carrier is fixed in rotation on the outlet shaft 319'. The planet-wheels 320 also mesh with a ring 322 having inside teeth and which is fixed to the inside of the housing 206.

It can be seen that in both variants the gear wheel having straight teeth 314 is the first gear wheel of a reduction stage making it possible to dispose the outlet shaft 319 or 319' in the housing 206 in a position which is offset or central, and which is orthogonal to the inlet shaft.

I claim:

1. A speed reduction gear having two drive chains, comprising an inlet shaft bearing two endless screws having threads inclined at an angle a in opposite directions, four gear wheels meshing together in pairs and with the endless screws on respective opposite sides thereof, two of the gear wheels which are diagonally opposite to each other being fixed in rotation with respective secondary gear wheels, characterized in that the secondary gear wheels have teeth inclined at an angle b and in opposite directions, the angles a and b being related by the relationship tan $a$/tan $b = D1/D2$, where D1 is the pitch diameter of the gear wheels and D2 is the pitch diameter of the secondary gear wheels, said secondary gear wheels each meshing with a respective tertiary gear wheel and the two tertiary gear wheels having their teeth inclined in opposite directions and being borne by an intermediate shaft on which they are fixed in rotation with a gear wheel having straight teeth which is the first gear wheel of a reduction stage, said intermediate shaft being free to move in an axial direction for balancing the transmitted torque.

2. A reduction gear according to claim 1, characterized in that the intermediate shaft (315) is situated in a central plane passing perpendicularly to the inlet shaft (201) between the endless screws (202, 203) in a housing (206) which contains the reduction gear, the gear wheel having straight teeth (314) which meshes with a toothed wheel (318) mounted on an outlet shaft (319) which is orthogonal to the inlet shaft (201) and which is offset to one side of the housing (206) relative to the said central plane.

3. A reduction gear according to claim 1, characterized in that the intermediate shaft (315) situated in a central plane passing perpendicularly to the inlet shaft (201) between the endless screws (202, 203) in a housing (206) which contains the reduction gear, said intermediate shaft (315) is hollow and contains an outlet shaft (319') which is free to rotate therein, which is orthogonal to the inlet shaft (201) and which is situated in the said central plane, the gear wheel having straight teeth (314) meshing with a plurality of planet wheels (320) carried by a planet carrier (321) which is fixed in rotation on the outlet shaft (319'), the said planet wheel also meshing with a fixed ring having inside teeth (322).

* * * * *